(12) United States Patent
Stockhausen et al.

(10) Patent No.: US 6,516,615 B1
(45) Date of Patent: Feb. 11, 2003

(54) HYDROGEN ENGINE APPARATUS WITH ENERGY RECOVERY

(75) Inventors: William Francis Stockhausen, Northville, MI (US); Donald Cameron Bingham, Wyandotte, MI (US); Robert Jay Natkin, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,977

(22) Filed: Nov. 5, 2001

(51) Int. Cl.$^7$ .............................................. F02G 1/00
(52) U.S. Cl. ...................................... 60/597; 123/527
(58) Field of Search ............................. 60/597, 605.1; 123/527, 528, 529

(56) References Cited

U.S. PATENT DOCUMENTS

| | | | |
|---|---|---|---|
| 4,059,076 A | * 11/1977 | Kosaka et al. | ................. 123/3 |
| 4,122,673 A | * 10/1978 | Leins | .......................... 60/274 |
| 4,523,548 A | * 6/1985 | Engel et al. | ................. 123/1 A |
| 4,733,536 A | * 3/1988 | DiBella et al. | ............... 60/618 |
| 4,910,959 A | * 3/1990 | Dones | ......................... 60/280 |
| 5,121,607 A | 6/1992 | George, Jr. | |
| 5,327,987 A | 7/1994 | Abdelmalek | |
| 5,806,332 A | 9/1998 | Shea, Sr. | |
| 5,829,418 A | * 11/1998 | Tamura et al. | .............. 123/529 |
| 6,276,138 B1 | * 8/2001 | Welch | .......................... 60/602 |

OTHER PUBLICATIONS

LN2000: The University of Washington's Liquid Nitrogen Propelled Automobile; APB–Aug. 27, 1997.
Orwig, Greg, Smogmobile Is Hot New Vehicle Running On Super Cold Fuel, University Week, vol. 14, No. 34, Aug. 7, 1997, University of Washington, Seattle, WA.
Orwig, Greg, Cool Car, Columns, University of Washington News & Information Office.
Hertzberg, A., Bruckner, A.P., Mattick, A.T., Knowlen, C., University of Washington's Liquid Nitrogen Automobile, University of Washington Aerospace and Energetics Research Program, Seattle, WA, Oct. 28, 1997.
Hertzberg, A., Bruckner, A.P., Mattick, A.T., Knowlen, C., High Efficiency Energy Conversion Systems For Liquid Nitrogen Automobiles, Society of Automotive Engineers, Inc., 1998.
Cryogenic Automobile Propulsion, 1995, 33$^{rd}$ Joint Propulsion Conference, Reno, Nevada.

* cited by examiner

Primary Examiner—Hoang Nguyen

(57) ABSTRACT

A system for an automobile has a compressed fuel source (14) having a first fuel pressure. An expansion device (26) is coupled to the compressed fuel source (14) and reduces the first pressure to a second pressure lower than the first pressure. The expansion device (26) generates a first quantity of work and forms a reduced pressure fuel. A chemical energy conversion engine (16) is coupled to the expansion device (26) and receives a reduced pressure fuel. The chemical energy conversion engine (16) generates a second quantity of work in response to the decompressed fuel. In one aspect of the invention, the first quantity of work and the second quantity of work may be coupled to an output shaft (20) such as the crankshaft of an internal combustion engine. In another aspect of the invention, the first quantity of work may be coupled to an accessory (40) either directly or indirectly. Indirect coupling may, for example, be performed using an accessory drive belt of the internal combustion engine.

15 Claims, 2 Drawing Sheets

HYDROGEN ENGINE APPARATUS WITH ENERGY RECOVERY

BACKGROUND OF THE INVENTION

1. Technical Field

The present invention relates generally to chemical energy conversion engines, and specifically, to methods and apparatus for recovering mechanical energy for gaseous fuel chemical energy conversion engines.

2. Background

Liquid gasoline is the most commonly used fuel source for internal combustion engines for automotive vehicles. Liquid gasoline has a high volumetric density of energy and therefore may be easily transported. Gasoline, however, is formed from fossil fuels and therefore the resources are limited.

Automakers are increasingly investigating alternative sources for powering vehicles such as propane, natural gas, and hydrogen fueled chemical energy conversion engines. Examples of chemical energy conversion engines are not limited to but include internal combustion engines, gas turbine engines, and chemical fuel cells. These vehicle systems require highly pressurized gases or liquids that must be stored on-board a vehicle. The fuel contains stored mechanical potential energy, due to the elevated pressure, in addition to chemical potential energy. Typically, during operation of the vehicle a pressure regulator reduces the high-pressure fuel to a lower level for use within the vehicle engine. Mechanical energy is lost to the environment when expanding through a pressure regulator. Because the volumetric energy density of gaseous fuel is substantially lower than gasoline, highly compressed fuel is often used to achieve vehicle range levels desired in current automotive vehicles.

Therefore, it would be desirable to further increase the useful energy of a compressed fuel source to increase the overall efficiency of the system.

SUMMARY OF INVENTION

The present invention increases the total work output of a chemical energy conversion engine system for an automotive vehicle. The present invention uses a compressed fuel source having a first fuel pressure. An expansion device is coupled to the compressed gaseous fuel source and reduces the first pressure to a second pressure lower than the first pressure. The expansion device generates a first quantity of work and forms a reduced pressure gaseous fuel. A chemical energy conversion engine is coupled to the expansion device and receives a reduced pressure fuel. The chemical energy conversion engine generates a second quantity of work in response to the decompressed fuel.

In a further aspect of the invention, the first quantity of work and the second quantity of work may be coupled to an output shaft such as the crankshaft of an internal combustion engine. In another aspect of the invention, the first quantity of work may be coupled to an accessory either directly or indirectly. Indirect coupling may, for example, be performed using an accessory drive belt of an engine, or using a generator to produce electricity.

In a further aspect of the invention, a method of operating a compressed fuel chemical energy conversion engine comprises:

expanding a compressed gaseous fuel in an expansion device to form a reduced pressure gaseous fuel;

generating a supplemental work output from the expansion device;

operating a chemical energy conversion engine with the decompressed fuel to generate primary work; and coupling the supplemental work output to a vehicle component.

One advantage of the invention is that the efficiency of a compressed fuel system is increased. Another advantage of the invention is that a heat exchanger may be added to re-route waste heat from the chemical energy conversion engine to the compressed gaseous fuel to further increase the system efficiency.

Other advantages and features of the present invention will become apparent when viewed in light of the detailed description of the preferred embodiment when taken in conjunction with the attached drawings and appended claims.

DETAILED DESCRIPTION

Figure 1:
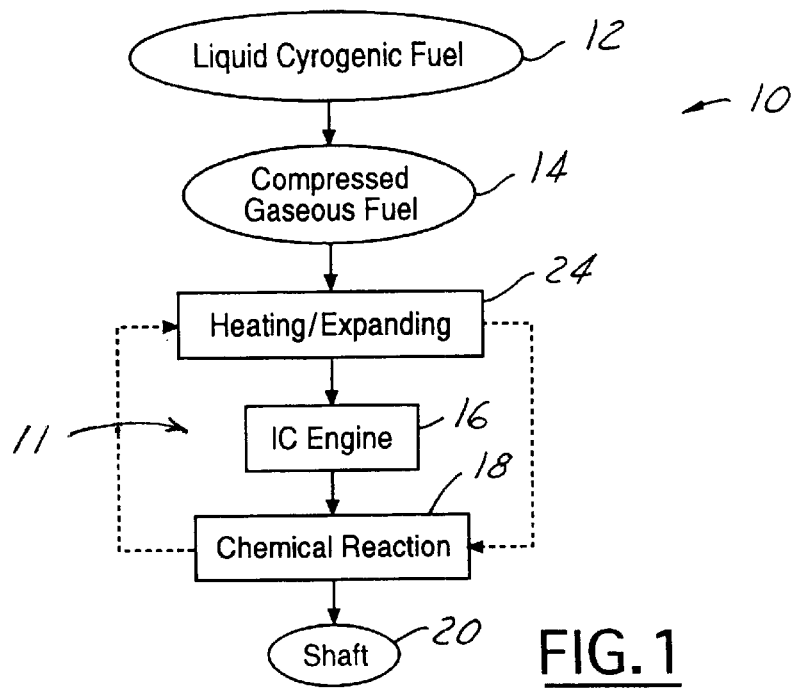
FIG. 1 is a block diagrammatic flow chart of a fuel and engine system according to the present invention.

In the following figures the same reference numerals are used to identify the same components in the various views. The quantities provided herein are given by way of example only and are not meant to be limiting. The following description is provided relative to a chemical energy conversion engine system that may include but is not limited to an internal combustion engine, a gas turbine engine and chemical fuel cells. The present invention also applies to cryogenic liquid fuels that are vaporized and expanded to a relatively low positive pressure using waste heat alone before being expanded by an expansion device.

Referring now to FIG. 1, an automotive vehicle 10 having a chemical energy conversion engine system 11 is illustrated having a compressed gaseous fuel source 14. The compressed gaseous fuel source 14 contains chemical constituents that may produce useful work by a chemical energy conversion engine 16. The fuel source possesses the properties of a chemical reducing agent. Engine 16 uses chemical reaction 18 to generate work on a shaft 20. One example of a chemical reaction is combustion in an internal combustion engine. Shaft may, for example, be a crankshaft. Chemical reaction 18 may also generate heating of the engine 16 or its associated components. A heating/expanding step 24 expands the compressed gaseous fuel source 14 prior to consumption within the internal combustion engine 16. Useful work generated by the expansion within step 24 may also be coupled to shaft 20 to provide supplemental shaft work on shaft 20.

The efficiencies of the present invention are illustrated in FIG. 1: the fuel and engine system re-use waste heat from the chemical reaction process to heat the fuel in step 24. That is, the unaided expansion of a gaseous fluid results in a reduction of the temperature of the fuel. However, by utilizing the waste heat, the gaseous fuel may be maintained at a predetermined temperature or even heated to an elevated temperature during and/or prior to the expansion within step 24. While reducing the compression from a first pressure to a second reduced pressure an expansion device may be utilized to transform the stored mechanical potential energy into useful work energy. The result is more efficient fuel utilization and a more efficient vehicle system.

Figure 2:
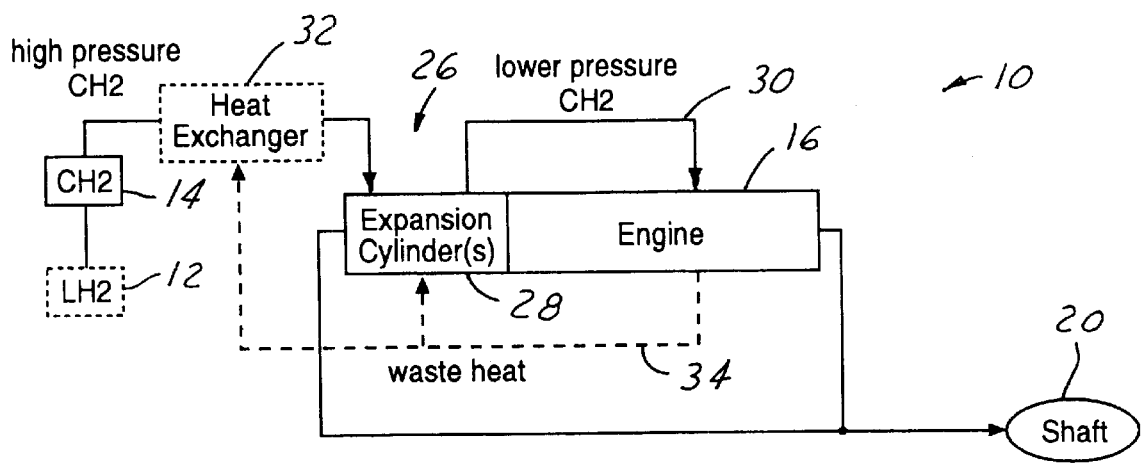
FIG. 2 is a block diagrammatic view of a first embodiment of an engine system according to the present invention.

Referring now to FIG. 2, compressed gaseous fuel source 14 is illustrated as part of system 10. In the following example, hydrogen ($H_2$) is used as the combustible fuel. However, those skilled in the art will recognize that other gaseous reduction agents (fuels) may also be used. Compressed gaseous fuel source 14 contains fuel at a first pressure, which is coupled to a chemical energy conversion engine 16. In the present example 200 atm is the compressed gaseous fuel pressure. Because the engine 16 does not require a very high-pressure fuel source, an expansion device 26 is used to extract potential energy from the compressed gaseous fuel while reducing the first pressure to a lower second pressure. In the present example 6.8 atm is used as the second pressure. In this embodiment, expansion device 26 comprises expansion cylinder(s) 28 which may be one or more cylinders of an internal combustion engine 16. Expansion cylinders 28 receive the highly compressed fuel and as it expands generates a lower pressure fuel as illustrated by arrow 30 that is used in the combustion process of engine 16. Said in another way, expansion cylinders 28 do not participate in the combustion process but generate supplemental work on shaft 20 in addition to the primary work generated in engine 16.

As illustrated, a heat exchanger 32 may also be used to supply waste heat from the chemical reaction process of engine 16 to the incoming high-pressure gaseous fuel. Also, because expansion cylinder(s) 28 are located within the same engine block as the combustion process of engine 16, expansion cylinder(s) 28 will also use waste energy from the engine to heat the high pressure gaseous fuel as it expands. Other sources of heat energy within the automotive vehicle that may be used within heat exchanger 32 include but are not limited to exhaust gases, engine coolant, ambient air, a turbo or supercharged intercooler, or an AC condenser.

Figure 3:
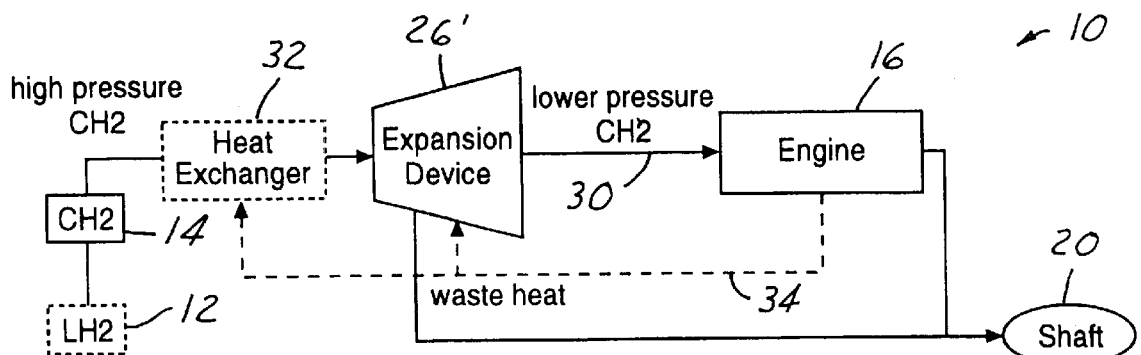
FIG. 3 is block diagrammatic view of a second embodiment of an engine system according to the present invention.

Referring now to FIG. 3, a block diagrammatic view with an alternative expansion device 26' is illustrated. In this embodiment, expansion device 26' is a separate device used to provide supplemental work to shaft 20. Various types of expansion devices may be used and include but are not limited to a turbine, a rotary pump, and other types of positive displacement pumps. Preferably, the expansion device 26' is coupled to shaft 20. Expansion device 26' may be directly coupled to shaft 20, or expansion device 26' may be coupled to shaft through an accessory drive belt or other type of linking device. In this embodiment, waste heat 34 is also coupled to expansion device 26' and heat exchanger 32. By using waste heat 34 the efficiency of the entire engine system 10 is improved.

Figure 4:
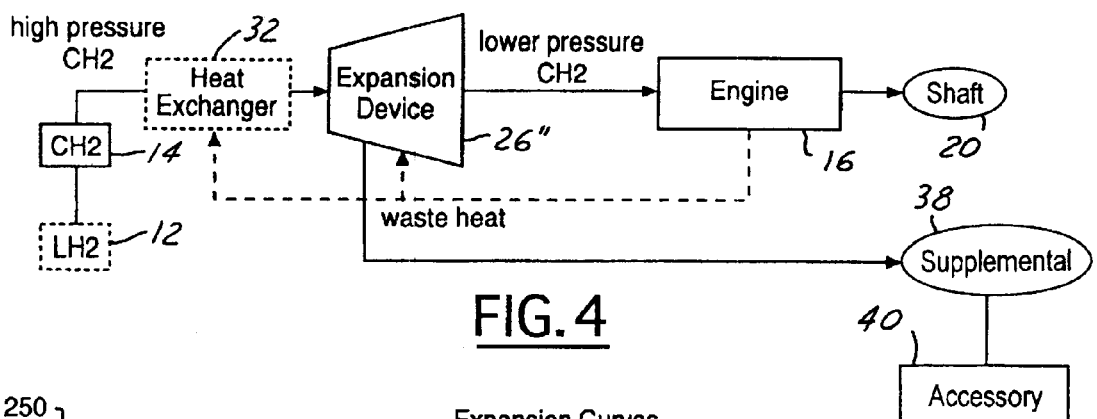
FIG. 4 is a block diagrammatic view of a third alternative embodiment according to the present invention.

Referring now to FIG. 4, a third embodiment of expansion device 25 of FIG. 2 is illustrated as expansion device 26'''. In this embodiment supplemental work 38 is provided by expansion device 26'' in a similar manner to that described above with respect to expansion device 26' in FIG. 3. However, in this example, the work provided may be hydraulic, electrical, or mechanical work used by onboard accessories 40 in the automotive vehicle 10. In this embodiment an optional heat exchanger 32 may also be used.

Figure 5:
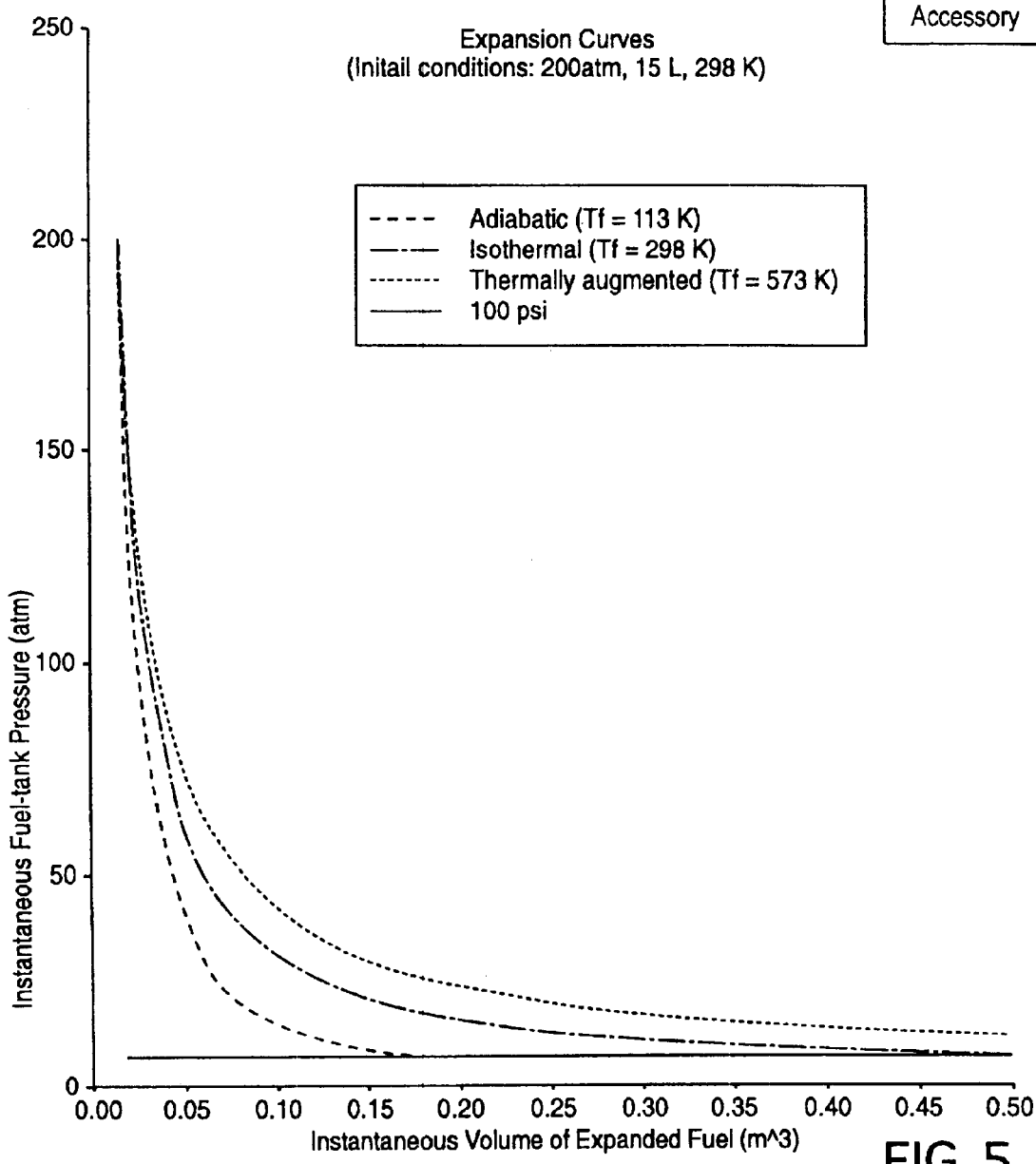
FIG. 5 is a plot of fuel tank pressure versus expanded volume of fuel in adiabatic, isothermal and thermal augmented embodiments.

Referring now to FIG. 5, a plot illustrating the amount of work available in an adiabatic system, an isothermal system, and a thermally augmented system is illustrated. In this plot, the area under the curve represents the amount of supplemental work that is potentially available dependent on the pressure of the fuel in the tank.

To extract the stored mechanical energy, it is preferable to use an isothermal expansion process. That is, heat is supplied to the compressed fuel as it expands while maintaining a constant or near constant temperature. The heat energy available from sources such as exhaust gases, ambient air, engine coolant, the air conditioning compressor, or a supercharger/turbocharger intercooler may be used in addition to other sources. The combination of the heat sources may be used alone or in combination. As an example, for isothermal expansion from 200 atm to 6.8 atm the average heat input required is 2100 Btu/kg of hydrogen. In an internal combustion engine approximately 68,000 Btu/kg of hydrogen are lost in the exhaust and cooling systems in the form of waste heat. Thus, there is ample waste heat energy available for this process on board the vehicle system. The addition of heat beyond what is required for isothermicity is termed "thermal augmentation" and may be performed either in the optional heat exchanger 32 or during the expansion in expansion device 26, further increasing the efficiency of the system.

The following is an example of a process using isothermal expansion at 298K and the initial fuel tank pressure being 200 atm and utilizing hydrogen as the gaseous fuel in an internal combustion engine. The delivery pressure to the internal combustion engine is 6.8 atm. By utilizing 40% of the chemical energy in the internal combustion engine and 90% of the mechanical energy in the expansion device (which is limited by the efficiency of the expansion device) the adiabatic expansion delivers on average 1630 Btu/kg hydrogen usable energy. In comparison, an isothermal expansion delivers on average 3550 Btu/kg hydrogen and the combustion process releases approximately 45,000 Btu/kg hydrogen net chemical energy. On average, 2100 Btu/kg of hydrogen from the waste heat are required to maintain the isothermal process. Energy content of the waste heat is approximately 68,000 Btu/kg of hydrogen. The average effective brake thermal efficiency (BTE) as the fuel tank empties is 43.1% for isothermal expansion and combustion compared to 40% for combustion alone (this is the assumed efficiency of a hydrogen fuelled internal combustion engine). For an adiabatic expansion, the peak available mechanical energy is 5.5% of the total useful chemical energy. The peak available energy represents 9.91% of the total for an isothermal expansion in this example.

To summarize the process, compressed gaseous fuel is provided to an expansion device 26 wherein the potential energy from the pressurized gaseous fuel may be utilized in generating supplemental work output prior to being consumed in a chemical energy conversion engine. The supplemental work output may be coupled directly or indirectly to the output shaft of the engine. The expansion device extracts the work while reducing the pressure of the fuel to the level required by the engine. The chemical energy conversion engine generates primary work via chemical reaction, which may be supplemented by the additional work energy provided by the expansion device. The system may also use the expansion device as an alternative power source for accessories on-board the automotive vehicle. Further, the expansion device may or may not be physically coupled or proximate to the chemical energy conversion engine.

While particular embodiments of the invention have been shown and described, numerous variations and alternate embodiments will occur to those skilled in the art.

Accordingly, it is intended that the invention be limited only in terms of the appended claims.

What is claimed is:

1. A compressed gaseous fuel chemical energy conversion engine system comprising:
   a compressed gaseous fuel source having a first fuel pressure;
   an expansion device coupled to said compressed gaseous fuel source reducing said first fuel pressure to a second fuel pressure lower than said first fuel pressure to form a reduced pressure fuel, thereby said expansion device generating a first quantity of work; and
   a chemical energy conversion engine coupled to said expansion device and receiving said reduced pressure fuel, said chemical energy conversion engine generating a second quantity of work in response to said reduced pressure fuel.

2. A system as recited in claim 1 wherein said chemical energy conversion engine generates a heat output, said system further comprising a heat exchanger coupled to said chemical energy conversion engine and coupling said heat output to said gaseous fuel at said first fuel pressure.

3. A system as recited in claim 1 further comprising a vehicle accessory coupled to said expansion device and operating using said first quantity of work.

4. A system as recited in claim 1 wherein said engine comprises an output shaft, wherein said expansion device is coupled to said output shaft.

5. A system as recited in claim 1 wherein said gaseous fuel comprises hydrogen.

6. A system as recited in claim 1 wherein said first expansion device comprises one selected from the group of a turbine, a rotary pump, a centrifugal pump, and a piston motor.

7. A system as recited in claim 1 further comprising a heat exchanger coupled with said compressed gaseous fuel source.

8. A system as recited in claim 1 wherein said expansion device is coupled to an accessory drive.

9. A compressed gaseous fuel chemical energy conversion engine system comprising:
   a compressed gaseous fuel source having a first fuel pressure;
   an expansion device coupled to said compressed gaseous fuel source reducing said pressure; and
   a chemical energy conversion engine having an output shaft, said engine generating primary work and coupling said primary work to said output shaft, said engine further generating heat output;
   said expansion device generating a secondary quantity of work that is coupled to said output shaft;
   said heat output coupled to said expansion device, transferring said heat output to said gaseous fuel.

10. A system as recited in claim 9 further comprising a heat exchanger coupled to said internal combustion engine and coupling said heat output to said compressed gaseous fuel.

11. A system as recited in claim 9 wherein said first expansion device comprises one selected from the group of a turbine, a rotary pump, a centrifugal pump, and a piston motor.

12. A system as recited in claim 9 further comprising a heat exchanger coupled with said compressed gaseous fuel source.

13. A system as recited in claim 9 wherein said expansion device is coupled to an accessory drive.

14. A method of operating a compressed gaseous fuel chemical energy conversion engine comprising:
   expanding a compressed gaseous fuel in an expansion device to form a reduced pressure gaseous fuel;
   generating a supplemental work output from said expansion device;
   operating a chemical energy conversion engine with the said reduced pressure gaseous fuel to generate primary work; and
   coupling the said supplemental work output to a vehicle component.

15. A method as recited in claim 14 wherein the step of coupling comprises coupling the supplemental work output to the output shaft of a chemical energy conversion engine and coupling the primary work output to the output shaft.